(12) United States Patent
Khoury et al.

(10) Patent No.: US 10,854,205 B2
(45) Date of Patent: Dec. 1, 2020

(54) CHANNEL-COMPENSATED LOW-LEVEL FEATURES FOR SPEAKER RECOGNITION

(71) Applicant: PINDROP SECURITY, INC., Atlanta, GA (US)

(72) Inventors: Elie Khoury, Atlanta, GA (US); Matthew Garland, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 16/505,452

(22) Filed: Jul. 8, 2019

(65) Prior Publication Data

US 2019/0333521 A1    Oct. 31, 2019

Related U.S. Application Data

(63) Continuation of application No. 15/709,024, filed on Sep. 19, 2017, now Pat. No. 10,347,256.

(Continued)

(51) Int. Cl.
*G10L 17/20* (2013.01)
*G10L 17/18* (2013.01)
(Continued)

(52) U.S. Cl.
CPC ............. *G10L 17/20* (2013.01); *G10L 17/02* (2013.01); *G10L 17/04* (2013.01); *G10L 17/18* (2013.01); *G10L 19/028* (2013.01)

(58) Field of Classification Search
CPC combination set(s) only.
See application file for complete search history.

(56) References Cited

U.S. PATENT DOCUMENTS

| 4,817,156 A | 3/1989 | Bahl et al. |
| 4,829,577 A | 5/1989 | Kuroda et al. |

(Continued)

FOREIGN PATENT DOCUMENTS

| WO | WO-2016/195261 A1 | 12/2016 |
| WO | WO-2017/167900 A1 | 10/2017 |

OTHER PUBLICATIONS

Kockmann-M et al.; Syllable based feature-contours for speaker recognition; Proc. 14th International Workshop on Advances . . . , 2008—fit.vutbr.cz (Year: 2008).*

(Continued)

*Primary Examiner* — Abul K Azad
(74) *Attorney, Agent, or Firm* — Foley & Lardner LLP

(57) ABSTRACT

A system for generating channel-compensated features of a speech signal includes a channel noise simulator that degrades the speech signal, a feed forward convolutional neural network (CNN) that generates channel-compensated features of the degraded speech signal, and a loss function that computes a difference between the channel-compensated features and handcrafted features for the same raw speech signal. Each loss result may be used to update connection weights of the CNN until a predetermined threshold loss is satisfied, and the CNN may be used as a front-end for a deep neural network (DNN) for speaker recognition/verification. The DNN may include convolutional layers, a bottleneck features layer, multiple fully-connected layers and an output layer. The bottleneck features may be used to update connection weights of the convolutional layers, and dropout may be applied to the convolutional layers.

20 Claims, 8 Drawing Sheets

Related U.S. Application Data

(60) Provisional application No. 62/396,670, filed on Sep. 19, 2016, provisional application No. 62/396,617, filed on Sep. 19, 2016.

(51) Int. Cl.
  *G10L 17/02* (2013.01)
  *G10L 17/04* (2013.01)
  *G10L 19/028* (2013.01)

(56) References Cited

U.S. PATENT DOCUMENTS

| | | | |
|---|---|---|---|
| 4,972,485 | A | 11/1990 | Dautrich et al. |
| 5,072,452 | A | 12/1991 | Brown et al. |
| 5,475,792 | A | 12/1995 | Stanford et al. |
| 5,835,890 | A | 11/1998 | Matsui et al. |
| 5,995,927 | A | 11/1999 | Li |
| 6,009,392 | A | 12/1999 | Kanevsky et al. |
| 6,055,498 | A | 4/2000 | Neumeyer et al. |
| 6,094,632 | A | 7/2000 | Hattori |
| 6,141,644 | A | 10/2000 | Kuhn et al. |
| 6,411,930 | B1 | 6/2002 | Burges |
| 6,463,413 | B1 | 10/2002 | Applebaum et al. |
| 6,519,561 | B1 | 2/2003 | Farrell et al. |
| 6,760,701 | B2 | 7/2004 | Sharma et al. |
| 6,882,972 | B2 | 4/2005 | Kompe et al. |
| 6,922,668 | B1 | 7/2005 | Downey |
| 6,975,708 | B1 | 12/2005 | Scherer |
| 7,003,460 | B1 | 2/2006 | Bub et al. |
| 7,209,881 | B2 | 4/2007 | Yoshizawa et al. |
| 7,318,032 | B1 | 1/2008 | Chaudhari et al. |
| 7,324,941 | B2 | 1/2008 | Choi et al. |
| 7,813,927 | B2 | 10/2010 | Navratil et al. |
| 8,160,811 | B2 | 4/2012 | Prokhorov |
| 8,160,877 | B1 | 4/2012 | Nucci et al. |
| 8,484,023 | B2 | 7/2013 | Kanevsky et al. |
| 8,484,024 | B2 | 7/2013 | Kanevsky et al. |
| 8,554,563 | B2 | 10/2013 | Aronowitz |
| 8,712,760 | B2 | 4/2014 | Hsia et al. |
| 8,886,663 | B2 | 11/2014 | Gainsboro et al. |
| 8,903,859 | B2 | 12/2014 | Zeppenfeld et al. |
| 9,042,867 | B2 | 5/2015 | Gomar |
| 9,336,781 | B2 | 5/2016 | Scheller et al. |
| 9,343,067 | B2 | 5/2016 | Ariyaeeinia et al. |
| 9,355,646 | B2 | 5/2016 | Oh et al. |
| 9,373,330 | B2 | 6/2016 | Cumani et al. |
| 9,401,143 | B2 | 7/2016 | Senior et al. |
| 9,401,148 | B2 | 7/2016 | Lei et al. |
| 9,406,298 | B2 | 8/2016 | Cumani et al. |
| 9,431,016 | B2 | 8/2016 | Aviles-Casco et al. |
| 9,454,958 | B2 | 9/2016 | Li et al. |
| 9,460,722 | B2 | 10/2016 | Sidi et al. |
| 9,466,292 | B1 | 10/2016 | Lei et al. |
| 9,502,038 | B2 | 11/2016 | Wang et al. |
| 9,514,753 | B2 | 12/2016 | Sharifi et al. |
| 9,558,755 | B1 | 1/2017 | Laroche et al. |
| 9,584,946 | B1 | 2/2017 | Lyren et al. |
| 9,620,145 | B2 | 4/2017 | Bacchiani et al. |
| 9,626,971 | B2 | 4/2017 | Rodriguez et al. |
| 9,633,652 | B2 | 4/2017 | Kurniawati et al. |
| 9,665,823 | B2 | 5/2017 | Saon et al. |
| 9,685,174 | B2 | 6/2017 | Karam et al. |
| 9,875,739 | B2 | 1/2018 | Ziv et al. |
| 9,875,742 | B2 | 1/2018 | Gorodetski et al. |
| 9,875,743 | B2 | 1/2018 | Gorodetski et al. |
| 9,881,617 | B2 | 1/2018 | Sidi et al. |
| 9,984,706 | B2 | 5/2018 | Wein |
| 10,347,256 | B2 * | 7/2019 | Khoury ............... G10L 17/04 |
| 2002/0095287 | A1 | 7/2002 | Botterweck |
| 2002/0143539 | A1 | 10/2002 | Botterweck |
| 2004/0218751 | A1 | 11/2004 | Colson et al. |
| 2004/0230420 | A1 | 11/2004 | Kadambe et al. |
| 2005/0038655 | A1 | 2/2005 | Mutel et al. |
| 2005/0039056 | A1 | 2/2005 | Bagga et al. |
| 2005/0286688 | A1 | 12/2005 | Scherer |
| 2006/0111905 | A1 | 5/2006 | Navratil et al. |
| 2007/0019825 | A1 | 1/2007 | Marumoto et al. |
| 2007/0198257 | A1 | 8/2007 | Zhang et al. |
| 2007/0294083 | A1 | 12/2007 | Bellegarda et al. |
| 2008/0195389 | A1 | 8/2008 | Zhang et al. |
| 2008/0312926 | A1 | 12/2008 | Vair et al. |
| 2010/0131273 | A1 | 5/2010 | Aley-Raz et al. |
| 2010/0262423 | A1 | 10/2010 | Huo et al. |
| 2011/0010173 | A1 | 1/2011 | Scott et al. |
| 2013/0080165 | A1 | 3/2013 | Wang et al. |
| 2013/0300939 | A1 | 11/2013 | Chou et al. |
| 2014/0337017 | A1 | 11/2014 | Watanabe et al. |
| 2015/0127336 | A1 | 5/2015 | Lei et al. |
| 2015/0149165 | A1 | 5/2015 | Saon |
| 2015/0161522 | A1 | 6/2015 | Saon et al. |
| 2015/0189086 | A1 | 7/2015 | Romano et al. |
| 2016/0019883 | A1 | 1/2016 | Aronowitz |
| 2016/0078863 | A1 | 3/2016 | Chung et al. |
| 2016/0240190 | A1 | 8/2016 | Lee et al. |
| 2016/0275953 | A1 | 9/2016 | Sharifi et al. |
| 2016/0284346 | A1 | 9/2016 | Visser et al. |
| 2016/0343373 | A1 | 11/2016 | Ziv et al. |
| 2017/0069313 | A1 | 3/2017 | Aronowitz |
| 2017/0098444 | A1 | 4/2017 | Song |
| 2018/0082691 | A1 | 3/2018 | Khoury et al. |
| 2018/0249006 | A1 | 8/2018 | Dowlatkhah et al. |
| 2020/0137221 | A1 | 4/2020 | Dellostritto et al. |

OTHER PUBLICATIONS

Castaldo et al.; Compensation of nuisance factors for speaker and language recognition; IEEE Transactions on Audio, Speech, and Language Processing, vol. 15, No. 7, Sep. 2007—ieeexplore.ieee.org; (Year: 2007).*

Anguera, et al. "Partial sequence matching using an Unbounded Dynamic Time Warping algorithm." IEEE ICASSP, Apr. 2010, pp. 3582-3585.

Baraniuk, R.G., "Compressive Sensing [Lecture Notes]", IEEE Signal Processing Magazine, vol. 24, Jul. 2007, pp. 1-9.

Cumani, S., et al., "Factorized Sub-space Estimation for Fast and Memory Effective i-Vector Extraction", IEEE/ACM TASLP, vol. 22 Issue 1, Jan. 2014, pp. 248-259.

Dehak et al., "Front-end Factor Analysis for Speaker Verification", IEEE TASLP, vol. 19, No. 4, May 2011, 11 pages.

Garcia-Romero et al., "Unsupervised Domain Adaptation for i-vector Speaker Recognition," Odyssey 2014, pp. 260-264.

International Search Report and Written Opinion in corresponding PCT Application PCT/US2017/052335, dated Dec. 8, 2017, 10 pages.

Khoury et al., "Combining transcription-based and acoustic-based speaker identifications for broadcast news," ICASSP, Kyoto, Japan, 2012, pp. 4377-4380.

Khoury et al., "Hierarchical speaker clustering methods for the NIST i-vector challenge," Odyssey 2014, pp. 254-259.

Lei et al., "A Novel Scheme for Speaker Recognition Using a Phonetically-aware Deep Neural Network", Proceedings on ICASSP. Florence, Italy:IEEE Press, 2014:1695-1699.

Scheffer et al., "Content matching for short duration speaker recognition", INTERSPEECH, Sep. 14-18, 2014, pp. 1317-1321.

Schmidt, et al., "Large-scale speaker identification," ICASSP, 2014, pp. 1650-1654.

Sturim et al., "Speaker Linking and Applications Using Non-Parametric Hashing Methods," Interspeech, Sep. 2016, 5 pages.

Gao, J. et al., "Dimensionality Reduction via Compressive Sensing", Pattern Recognition Letters 33, Elsevier Science BV 0167-8655, 2012.

Ghahabi Omid et al., "Restricted Boltzmann Machine Supervectors for Speaker Recognition," 2015 IEEE International Conference on Acoustics, Speech and Signal Processing (ICASSP), IEEE, Apr. 19, 2015. pp. 4804-4808, XP033187673.

Kenny P. "A Small Footprint i-Vector Extractor" Proc. Odyssey Speaker and Language Recognition Workshop, Singapore, Jun. 25, 2012.

(56) References Cited

OTHER PUBLICATIONS

Szu-Wei Fu et al., "SNR-Aware Convolutional Neural Network Modeling for Speech Enhancement", Interspeech 2016, vol. 2016, Sep. 8, 2016, pp. 3768-3772, XP055427533.
Xu, L., et al. "Rapid Computation of i-Vector" Odyssey, Bilbao, Spain, Jun. 21-34, 2016.
Prince, S., et al., "Probabilistic, Linear Discriminant Analysis for Inferences about Identity," Proceedings of the International Conference on Computer Vision, Oct. 14-21, 2007.
Richardson, F. et al., "Speaker Recognition Using Real vs Synthetic Parallel Data for DNN Channel Compensation", INTERSPEECH, 2016.
Richardson, F., et al., "Deep Neural Network Approaches to Speaker and Language Recognition", IEEE Signal Processing Letters, vol. 22, No. 10, Oct. 2015, pp. 1671-1675.
Richardson, F., et al., "Channel Compensation for Speaker Recognition using MAP Adapted PLDA and Denoising DNNs", Proc. Speaker Lang. Recognit. Workshop, Jun. 22, 2016, pp. 225-230.
Solomonoff, A., et al. "Nuisance Attribute Projection", Speech Communication, Elsevier Science BV, Amsterdam, The Netherlands. May 1, 2007.
Zhang et al. "Extracting Deep Neural Network Bottleneck Features using Low-rank Matrix Factorization", IEEE ICASSP, 2014.
McLaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.
Zheng et al. "Extracting Deep Neural Network Bottleneck Features using Low-rank Matrix Factorization", IEEE ICASSP, 2014.
Zheng et al. An experimental study of speech emotion recognition based on deep convolutional neural networks; 2015 International Conference on Affective Computing & Intelligent Interaction (ACII); pp. 827-831. (Year: 2015).
W.Q. Zheng et al., An experimental study of speech emotion recognition based on deep convolutional neural networks; 2015 International Conference on Affective Computing & Intelligent Interaction (ACII); pp. 827-831. (Year 2015).
Canadian Office Action, dated Jan. 23, 2020, issued in corresponding Canadian Application No. 3,036,561, 5 pages.
PCT/US2017/052293 International Preliminary Report on Patentability, dated Mar. 19, 2019, with Written Opinion of the International Searching Authority, 8 pages.
Ahmad et al., A unique approach in text independent speaker recognition using MFCC feature sets and probabilistic neural network, In 2015 Eighth International Conference on Advances in Pattern Recognition (ICAPR), pp. 1-6, IEEE, 2015.
Buera, et al., "Unsupervised data-driven feature vector normalization with acoustic model adaptation for robust speech recognition", IEEE transactions on audio, speech, and language processing, vol. 18, No. 2, 2010, pp. 296-309.
Campbell, "Using Deep Belief Networks for Vector-Based Speaker Recognition", Proceedings of Interspeech 2014, Sep. 14, 2014, pp. 676-680, XP055433784.
International Preliminary Report on Patentability and Written Opinion issued in corresponding International Application No. PCT/US2017/052335 dated Mar. 19, 2019.
International Preliminary Report on Patentability and Written Opinion of the International Searching Authority issued in International Application No. PCT/US2017/052316 dated Mar. 19, 2019.
International Search Report and The Written Opinion of the International Searching Authority, or the Declaration issued in International Application No. PCT/US20/17051 dated Apr. 23, 2020.
International Search Report issued in corresponding International Application No. PCT/US2017/052293 dated Dec. 21, 2017.
International Search Report issued in corresponding International Application No. PCT/US2017/052316 dated Dec. 21, 2017.
Kenny et al., "Deep Neural Networks for extracting Baum-Welch statistics for Speaker Recognition", Jun. 29, 2014, XP055361192, Retrieved from the Internet: URL:http://www.crim.ca/perso/patrick.kenny/stafylakis_odyssey2014_v2.pdf, [retrieved on Apr. 3, 2017].
Snyder et al., Time delay deep neural network-based universal background models for speaker recognition, In 2015 IEEE Workshop on Automatic Speech Recognition and Understanding (ASRU) pp. 92-97, IEEE, 2015.
Variani et al., "Deep neural networks for small footprint text-dependent speaker verification", 2014 IEEE International Conference on Acoustics, Speech and Signal Processing (ICASSP), IEEE, May 4, 2014, pp. 4052-4056, XP032617560, DOI: 10.1109/ICASSP.2014.6854363 [retrieved on Jul. 11, 2014].
Yaman et al., "Bottleneck Features for Speaker Recognition", Proceedings of the Speaker and Language Recognition Workshop 2012, Jun. 28, 2012, pp. 105-108, XP055409424, Retrieved from the Internet: URL:https://pdfs.semanticscholar.org/3469/fe6e53e65bced5736480afe34b6c16728408.pdf [retrieved on Sep. 25, 2017].

* cited by examiner

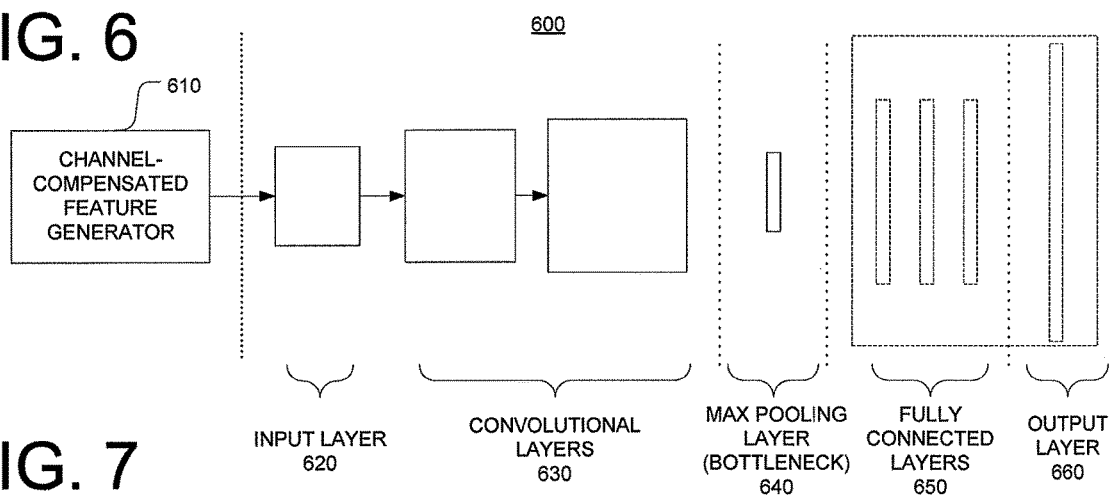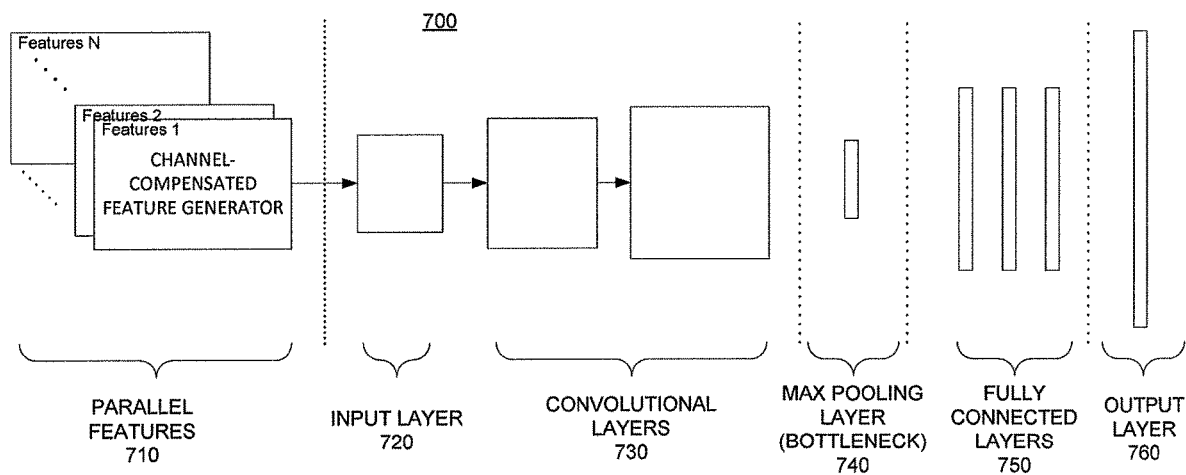

CHANNEL-COMPENSATED LOW-LEVEL FEATURES FOR SPEAKER RECOGNITION

This application is a continuation of U.S. patent application Ser. No. 15/709,024, filed Sep. 19, 2017, which claims domestic benefit, under 35 U.S.C. § 119, of U.S. Provisional Application No. 62/396,617 filed Sep. 19, 2016, titled "Improvements of GMM-Based Modeling for Speaker Recognition", and 62/396,670 also filed Sep. 19, 2016, titled "Improvements of Speaker recognition in the Call Center", which applications are incorporated herein by reference thereto.

This application is related to methods and systems for audio processing, and more particularly to audio processing for speaker identification.

BACKGROUND

Current state-of-the art approaches to speaker recognition are based on a universal background model (UBM) estimated using either acoustic Gaussian mixture modeling (GMM) or phonetically-aware deep neural network architecture. The most successful techniques consist of adapting the UBM model to every speech utterance using the total variability paradigm. The total variability paradigm aims to extract a low-dimensional feature vector known as an "i-vector" that preserves the total information about the speaker and the channel. After applying a channel compensation technique, the resulting i-vector can be considered a voiceprint or voice signature of the speaker.

One drawback of such approaches is that, in programmatically determining or verifying the identity of a speaker by way of a speech signal, a speaker recognition system may encounter a variety of elements that can corrupt the signal. This channel variability poses a real problem to conventional speaker recognition systems. A telephone user's environment and equipment, for example, can vary from one call to the next. Moreover, telecommunications equipment relaying a call can vary even during the call.

In a conventional speaker recognition system a speech signal is received and evaluated against a previously enrolled model. That model, however, typically is limited to a specific noise profile including particular noise types such as babble, ambient or HVAC (heat, ventilation and air conditioning) and/or a low signal-to-noise ratio (SNR) that can each contribute to deteriorating the quality of either the enrolled model or the prediction of the recognition sample. Speech babble, in particular, has been recognized in the industry as one of the most challenging noise interference due to its speaker/speech like characteristics. Reverberation characteristics including high time-to-reverberation at 60 dB (T60) and low direct-to-reverberation ratio (DRR) also adversely affect the quality of a speaker recognition system. Additionally, an acquisition device may introduce audio artifacts that are often ignored although speaker enrollment may use one acquisition device while testing may utilize a different acquisition device. Finally, the quality of transcoding technique(s) and bit rate are important factors that may reduce effectiveness of a voice biometric system.

Conventionally, channel compensation has been approached at different levels that follow spectral feature extraction, by either applying feature normalization, or by including it in the modeling or scoring tools such as Nuisance Attribute Projection (NAP) (see Solomonoff, et al., "Nuisance attribute projection", Speech Communication, 2007) or Probabilistic Linear Discriminant Analysis (PLDA) (see Prince, et al., "Probabilistic Linear Discriminant Analysis for Inferences about Identity", IEEE ICCV, 2007).

A few research attempts have looked at extracting channel-robust low-level features for the task of speaker recognition. (See, e.g., Richardson et al. "Channel compensation for speaker recognition using MAP adapted PLDA and denoising DNNs", Proc. Speaker Lang. Recognit. Workshop, 2016; and Richardson, et al. "Speaker Recognition Using Real vs Synthetic Parallel Data for DNN Channel Compensation", INTERSPEECH, 2016.) These attempts employ a denoising deep neural network (DNN) system that takes as input corrupted Mel frequency cepstrum coefficients (MFCCs) and provides as output a cleaner version of these MFCCs. However, they do not fully explore the denoising DNN by applying it directly to the audio signal. A significant portion of relevant speaker-specific information is already lost after MFCC extraction of the corrupted signal, and it is difficult to fully cover this information by the DNN.

Other conventional methods explore using phonetically-aware features that are originally trained for automatic speech recognition (ASR) tasks to discriminate between different senones. (See Zhang et al. "Extracting Deep Neural Network Bottleneck Features using Low-rank Matrix Factorization", IEEE ICASSP, 2014). Combining those features with MFCCs may increase performance. However, these features are computationally expensive to produce: they depend on a heavy DNN-based automatic speech recognition (ASR) system trained with thousands of senones on the output layer. Additionally, this ASR system requires a significant amount of manually transcribed audio data for DNN training and time alignment. Moreover, the resulting speaker recognition will work only on the language that the ASR system is trained on, and thus cannot generalize well to other languages.

SUMMARY

The present invention is directed to a system that utilizes novel low-level acoustic features for the tasks of verifying a speaker's identity and/or identifying a speaker among a closed set of known speakers under different channel nuisance factors.

The present disclosure applies DNN directly on the raw audio signal and uses progressive neural networks instead of the simple fully-connected neural network used conventionally. The resulting neural network is robust to not only channel nuisance, but also to distinguish between speakers. Furthermore, the disclosed augmented speech signal includes transcoding artifacts that are missing in conventional systems. This additional treatment allows the disclosed speaker recognition system to cover a wide range of applications beyond the telephony channel including, for example, VoIP interactions and Internet of Things (IoT) voice-enabled devices such as AMAZON ECHO and GOOGLE HOME.

In an exemplary embodiment, a system for generating channel-compensated low level features for speaker recognition includes an acoustic channel simulator, a first feed forward convolutional neural network (CNN), a speech analyzer and a loss function processor. The acoustic channel simulator receives a recognition speech signal (e.g., an utterance captured by a microphone), degrades the recognition speech signal to include characteristics of an audio channel, and outputs a degraded speech signal. The first CNN operates in two modes. In a training mode the first CNN receives the degraded speech signal, and computes from the degraded speech signal a plurality of channel-compensated low-level features. In a test and enrollment mode, the CNN receives the recognition speech signal and calculates from it a set of channel-compensated, low-level features. The speech signal analyzer extracts features of the recognition speech signal for calculation of loss in the training mode. The loss function processor calculates the loss based on the features from the speech analyzer and the channel-compensated low-level features from the first feed forward convolutional neural network, and if the calculated loss is greater than the threshold loss, one or more connection weights of the first CNN are modified based on the computed loss. If, however, the calculated loss is less than or equal to the threshold loss, the training mode is terminated.

In accord with exemplary embodiments, the acoustic channel simulator includes one or more of an environmental noise simulator, a reverberation simulator, an audio acquisition device characteristic simulator, and a transcoding noise simulator. In accordance with some embodiments, each of these simulators may be selectably or programmatically configurable to perform a portion of said degradation of the recognition speech signal. In accordance with other exemplary embodiments the acoustic channel simulator includes each of an environmental noise simulator, a reverberation simulator, an audio acquisition device characteristic simulator, and a transcoding noise simulator.

In accord with exemplary embodiments, the environmental noise simulator introduces to the recognition speech signal at least one environmental noise type selected from a plurality of environmental noise types.

In accord with exemplary embodiments, the environmental noise simulator introduces the selected environmental noise type at a signal-to-noise ratio (SNR) selected from a plurality of signal-to-noise ratios (SNRs).

In accord with exemplary embodiments, the reverberation simulator simulates reverberation according to a direct-to-reverberation ratio (DRR) selected from a plurality of DRRs. Each DRR in the plurality of DRRs may have a corresponding time-to-reverberation at 60 dB (T60).

In accord with exemplary embodiments, the audio acquisition device characteristic simulator introduces audio characteristics of an audio acquisition device selectable from a plurality of stored audio acquisition device profiles each having one or more selectable audio characteristics.

In accord with exemplary embodiments, each audio acquisition device profile of the plurality of stored audio acquisition device profiles may include at least one of: a frequency/equalization characteristic, an amplitude characteristic, a filtering characteristic, an electrical noise characteristic, and a physical noise characteristic.

In accord with exemplary embodiments, the transcoding noise simulator selectively adds audio channel transcoding characteristics selectable from a plurality of stored transcoding characteristic profiles.

In accord with exemplary embodiments, each transcoding characteristic profile may include at least one of a quantization error noise characteristic, a sampling rate audio artifact characteristic, and a data compression audio artifact characteristic.

In accord with exemplary embodiments, the features from the speech signal analyzer and the channel-compensated features from the first CNN each include a corresponding at least one of Mel-frequency cepstrum coefficients (MFCC), low-frequency cepstrum coefficients (LFCC), and perceptual linear prediction (PLP) coefficients. That is, use by the loss function processor, the channel compensated features and the features from the speech signal analyzer are of similar type (e.g., both are MFCC).

In accord with exemplary embodiments, the system may further include a second, speaker-aware, CNN that, in the test and enrollment mode receives the plurality of channel-compensated features from the first CNN and extracts from the channel-compensated features a plurality of speaker-aware bottleneck features.

In accord with exemplary embodiments, the second CNN includes a plurality of convolutional layers and a bottleneck layer. The bottleneck layer outputs the speaker-aware bottleneck features. The second CNN may also include a plurality of fully connected layers, an output layer, and a second loss function processor each used during training of the second CNN. At least one of the fully connected layers may employ a dropout technique to avoid overfilling, with a dropout ratio for the dropout technique at about 30%. The second CNN may also include a max pooling layer configured to pool over a time axis.

In accord with exemplary embodiments, the second CNN may take as input at least one set of other features side by side with the channel-compensated features, the at least one set of other features being extracted from the speech signal.

In another exemplary embodiment, a method of training a deep neural network (DNN) with channel-compensated low-level features includes receiving a recognition speech signal; degrading the recognition speech signal to produce a channel-compensated speech signal; extracting, using a first feed forward convolutional neural network, a plurality of low-level features from the channel-compensated speech signal; calculating a loss result using the channel-compensated low-level features extracted from the channel-compensated speech signal and hand-crafted features extracted from the recognition speech signal; and modifying connection weights of the first feed forward convolutional neural network if the computed loss is greater than a predetermined threshold value.

Embodiments of the present invention can be used to perform a speaker verification task in which the user inputs a self-identification, and a recognition speech signal is used to confirm that a stored identity of the user is the same as the self-identification. In another embodiment, the present invention can be used to perform a speaker identification task in which the recognition speech signal is used to identify the user from a plurality of potential identities stored in association with respective speech samples. The aforementioned embodiments are not mutually exclusive, and the same low-level acoustic features may be used to perform both tasks.

The low-level features disclosed herein are robust against various noise types and levels, reverberation, and acoustic artifacts resulting from variations in microphone acquisition and transcoding systems. Those features are extracted directly from the audio signal and preserve relevant acoustic information about the speaker. The inventive contributions are many and include at least the following features: 1) an audio channel simulator for augmentation of speech data to include a variety of channel noise and artifacts, 2) derivation of channel-compensated features using a CNN (CNN), 3) an additional CNN model employed to generate channel-compensated features that are trained to increase inter-speaker variance and reduce intra-speaker variance, and 4) use of a multi-input DNN for increased accuracy.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

FIGURES

FIG. 6 is a block diagram of an acoustic features creating system employing a channel compensated feature generator and a second neural network for bottleneck features, according to exemplary embodiments of the present disclosure.

FIG. 7 is a block diagram of a speaker recognition system employing a plurality of feature generators, including a channel-compensated feature generator with the second neural network of FIG. 6, according to exemplary embodiments of the present disclosure.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary" used throughout this description means "serving as an example, instance, or illustration," and should not necessarily be construed as preferred or advantageous over other embodiments, whether labeled "exemplary" or otherwise. The detailed description includes specific details for the purpose of providing a thorough understanding of the embodiments of the disclosure. It will be apparent to those skilled in the art that the embodiments of the disclosure may be practiced without these specific details. In some instances, well-known structures and devices may be shown in block diagram form in order to avoid obscuring the novelty of the exemplary embodiments presented herein.

Figure 1:
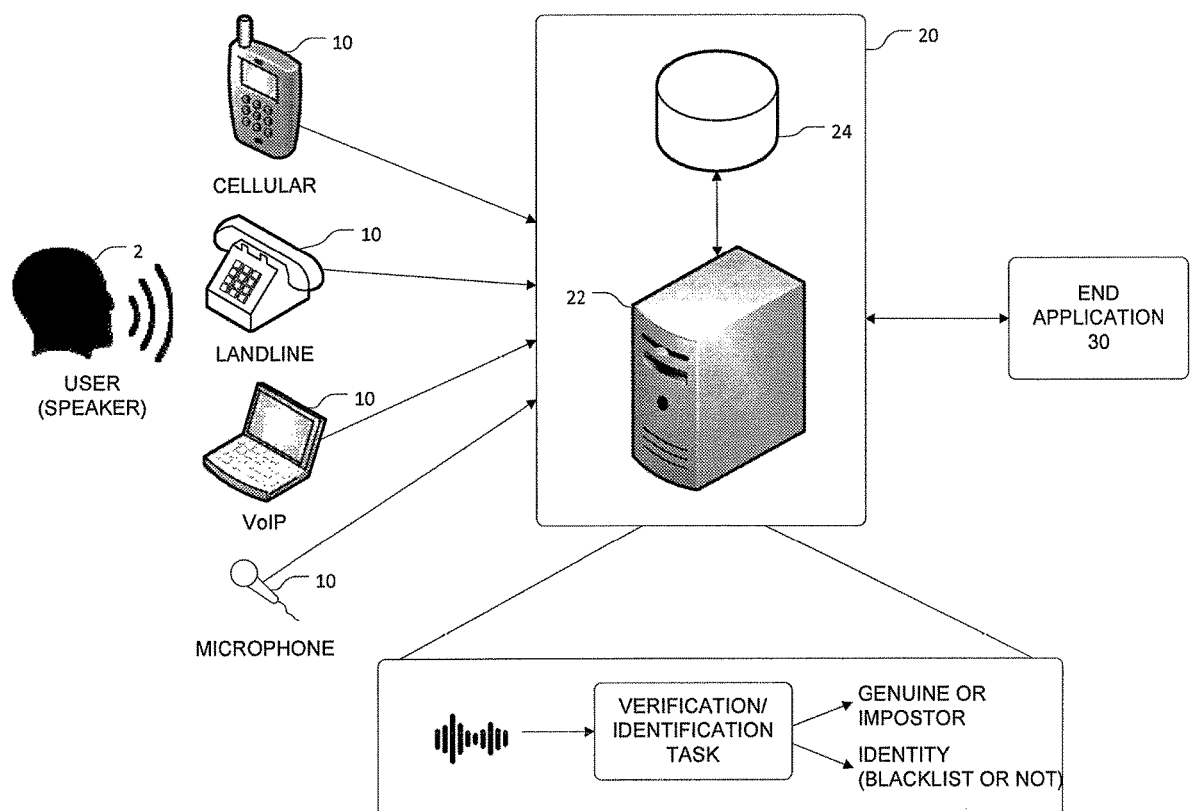
FIG. 1 is a block diagram illustrating a system for performing speaker recognition according to an exemplary embodiment of the present disclosure.

FIG. 1 is a block diagram that illustrates a system for performing speaker recognition according to an exemplary embodiment of the present invention. According to FIG. 1, a user or speaker 2 may speak an utterance into input device 10 containing an audio acquisition device, such as a microphone, for converting the uttered sound into an electrical signal. As particularly shown in FIG. 1, the input device 10 may be a device capable of telecommunications, such as a telephone (either cellular or landline) or a computer or other processor based device capable of voice over internet (VoIP) communications. In fact, it is contemplated that the present invention could be utilized specifically in applications to protect against, for example, telephone fraud, e.g., verifying that the caller is whom he/she claims to be, or detecting the caller's identity as somebody on a "blacklist" or "blocked callers list." Although it is contemplated that the input device 10 into which the recognition speech signal is spoken may be a telecommunication device (e.g., phone), this need not be the case. For instance, the input device 10 may simply be a microphone located in close proximity to the speaker recognition subsystem 20. In other embodiments, the input device 10 may be located remotely with respect to the speaker recognition subsystem.

According to FIG. 1, the user's utterance, which is used to perform speaker identification, will be referred to in this specification as the "recognition speech signal." The recognition speech signal may be electrically transmitted from the input device 10 to a speaker recognition subsystem 20.

The speaker recognition subsystem 20 of FIG. 1 may include a computing system 22, which can be a server or a general-purpose personal computer (PC), programmed to model a deep neural network. It should be noted, however, that the computing system 22 is not strictly limited to a single device, but instead may comprise multiple computers and/or devices working in cooperation to perform the operations described in this specification (e.g., training of the DNN may occur in one computing device, while the actual verification/identification task is performed in another). While single or multiple central processing units (CPU) may be used as a computing device both for training and testing, graphics processing units (GPU's) may also be used. For instance, the use of a GPU in the computing system 22 may help reduce the computational cost, especially during training. Furthermore, the computing system may be implemented in a cloud computing environment using a network of remote servers.

As shown in FIG. 1, the speaker recognition subsystem 20 may also include a memory device 24 used for training the DNN in exemplary embodiments. Particularly, this memory device 24 may contain a plurality of raw and/or sampled speech signals (or "speech samples") from multiple users or speakers, as well as a plurality of registered voiceprints (or "speaker models") obtained for users who have been "enrolled" into the speaker registration subsystem 20.

In some embodiments, the memory device 24 may include two different datasets respectively corresponding to the respective training and testing functions to be performed by the DNN. For example, to conduct training the memory device 24 may contain a dataset including at least two speech samples obtained as actual utterances from each of multiple speakers. The speakers need not be enrollees or intended enrollees. Moreover, the utterances need not be limited to a particular language. For use with the system disclosed herein, these speech samples for training may be "clean", i.e., including little environmental noise, device acquisition noise or other nuisance characteristics.

The memory device 24 may include another dataset to perform the "testing" function, whereby the DNN performs actual speaker recognition by positively verifying or identifying a user. To perform this function, the dataset need only include one positive speech sample of the particular user, which may be obtained as a result of "enrolling" the user into the speaker recognition subsystem 22 (which will be described in more detail below). Further, this dataset may include one or more registered voiceprints, corresponding to each user who can be verified and/or identified by the system.

Referring again to FIG. 1, the results of the speaker recognition analysis can be used by an end application 30 that needs to authenticate the caller (i.e., user), i.e., verifying that the caller is whom he/she claims to be by using the testing functions described herein. As an alternative, the end application 30 may need to identify any caller who is on a predefined list (e.g., blacklist or blocked callers). This can help detect a malicious caller who spoofs a telephone number to evade detection by calling line identification (CLID) (sometimes referred to as "Caller ID"). However, even though the present invention can be used by applications 30 designed to filter out malicious callers, the present invention is not limited to those types of applications 30. For instance, the present invention can be advantageously used in other applications 30, e.g., where voice biometrics are used to unlock access to a room, resource, etc. Furthermore, the end applications 30 may be hosted on a computing system as part of computing system 20 itself or hosted on a separate computing system similar to the one described above for computing system 20. The end application 30 may be also implemented on a (e.g., remote) terminal with the computing system 20 acting as a server. As another specific example, the end application 30 may be hosted on a mobile device such as a smart phone that interacts with computing system 20 to perform authentication using the testing functions described herein.

It should be noted that various modifications can be made to the system illustrated in FIG. 1. For instance, the input device 10 may transmit the recognition speech signal directly to the end application 30, which in turn relays the recognition speech signal to the speaker recognition subsystem 20. In this case, the end application 30 may also receive some form of input from the user representing a self-identification. For instance, in case of performing a speaker identification task, the end application 30 may request the user to identify him or herself (either audibly or by other forms of input), and send both the recognition speech signal and the user's alleged identity to the speech recognition subsystem 20 for authentication. In other cases, the self-identification of the user may consist of the user's alleged telephone number, as obtained by CLID. Furthermore, there is no limitation in regard to the respective locations of the various elements illustrated in FIG. 1. In certain situations, the end application 30 may be remote from the user, thus requiring the use of telecommunications for the user to interact with the end application 30. Alternatively, the user (and the input device 10) may be in close proximity to the end application 30 at the time of use, e.g., if the application 30 controls a voice-activated security gate, etc.

Figure 2A:
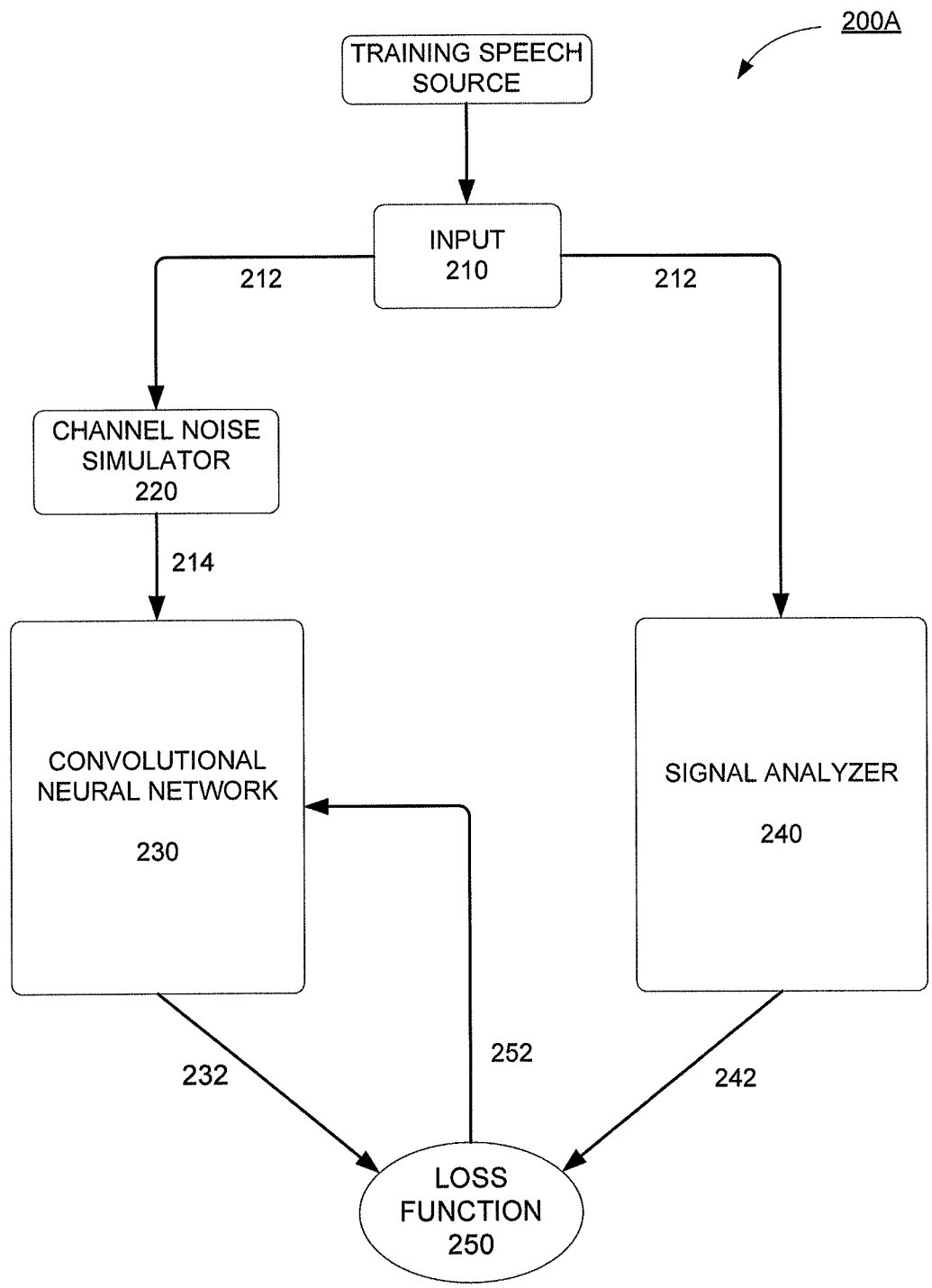
FIG. 2A illustrates a general structure of a deep neural network front end in a training mode, according to exemplary embodiments of the present disclosure.
Figure 2B:
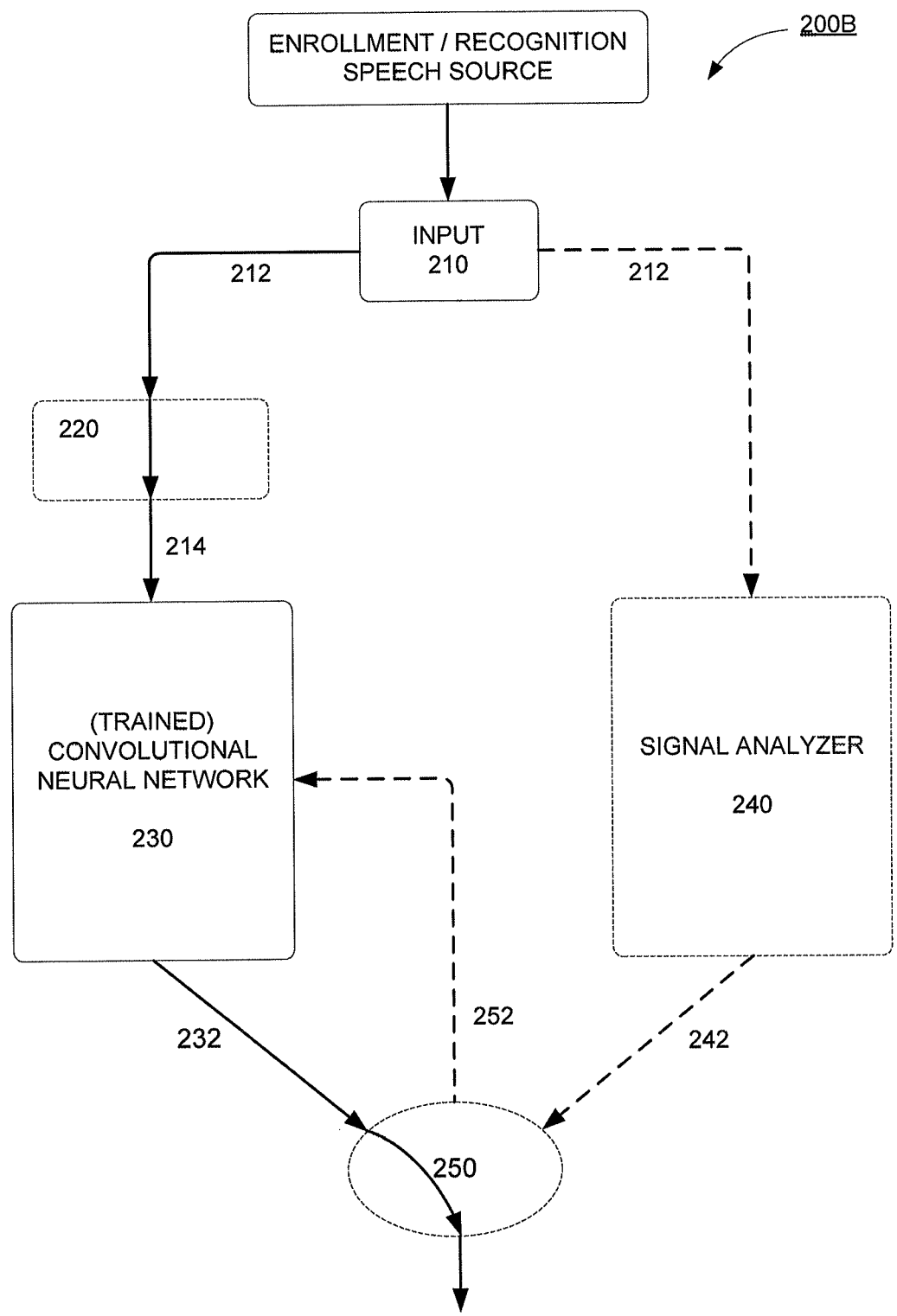
FIG. 2B illustrates a general structure of a deep neural network for use in testing and enrollment for a particular user, according to exemplary embodiments of the present disclosure.
Figure 2C:
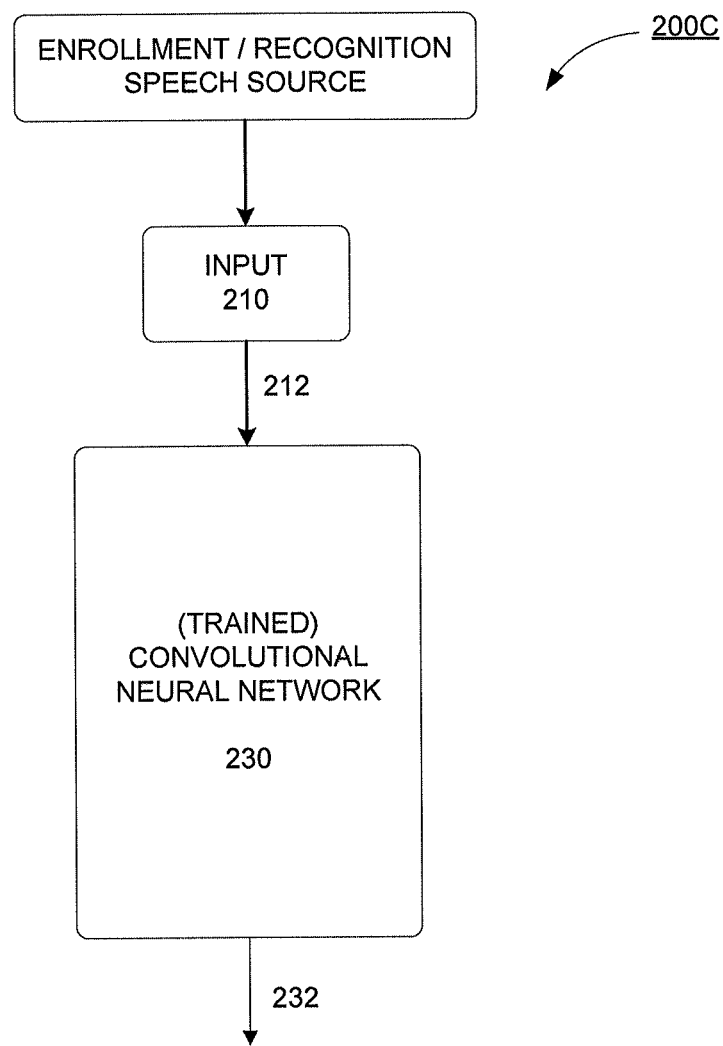
FIG. 2C illustrates a general structure of a deep neural network for use in testing and enrollment for a particular user, according to exemplary embodiments of the present disclosure.

Channel and background noise variability poses a real problem for a speaker recognition system, especially when there is channel mismatch between enrollment and testing samples. FIGS. 2A-2C illustrate a system 200A for training (FIG. 2A) and using (FIGS. 2B, 2C) a CNN in order to reduce this channel mismatch due to channel nuisance factors, thus improving the accuracy of conventional and novel speaker recognition systems.

The inventors have recognized that conventional speaker recognition systems are subject to verification/identification errors when a recognition speech signal for test significantly differs from an enrolled speech sample for the same speaker. For example, the recognition speech signal may include channel nuisance factors that were not significantly present in the speech signal used for enrolling that speaker. More specifically, at enrollment the speaker's utterance may be acquired relatively free of channel nuisance factors due to use of a high-quality microphone in a noise-free environment, with no electrical noise or interference in the electrical path from the microphone to recording media, and no transcoding of the signal. Conversely, at test time the speaker could be in a noisy restaurant, speaking into a low-quality mobile phone subject to transcoding noise and electrical interference. The added channel nuisance factors may render the resulting recognition speech signal, and any features extracted therefrom, too different from the enrollment speech signal. This difference can result in the verification/identification errors. FIGS. 2A-2C illustrate a front-end system for use in the speech recognition subsystem 20, which is directed to immunizing the speech recognition subsystem against such channel nuisance factors.

The training system 200A in FIG. 2A includes an input 210, an acoustic channel simulator (also referenced as a channel-compensation device or function) 220, a feed forward convolutional neural network (CNN) 230, a system analyzer 240 for extracting handcrafted features, and a loss function 250. A general overview of the elements of the training system 200A is provided here, followed by details of each element. The input 210 receives a speaker utterance, e.g., a pre-recorded audio signal or an audio signal received from a microphone. The input device 210 may sample the audio signal to produce a recognition speech signal 212. The recognition speech signal 212 is provided to both the acoustic channel simulator 220 and to the system analyzer 240. The acoustic channel simulator 220 processes the recognition speech signal 212 and provides to the CNN 230 a degraded speech signal 214. The CNN 230 is configured to provide features (coefficients) 232 corresponding to the recognition speech signal. In parallel, the signal analyzer 240 extracts handcrafted acoustic features 242 from the recognition speech signal 212. The loss function 250 utilizes both the features 232 from the CNN 230 and the handcrafted acoustic features 242 from the signal analyzer 240 to produce a loss result 252 and compare the loss result to a predetermined threshold. If the loss result is greater than the predetermined threshold T, the loss result is used to modify connections within the CNN 230, and another recognition speech signal or utterance is processed to further train the CNN 230. Otherwise, if the loss result is less than or equal to the predetermined threshold T, the CNN 230 is considered trained, and the CNN 230 may then be used for providing channel-compensated features to the speaker recognition subsystem 20. (See FIG. 2B, discussed in detail below.)

Figure 3:
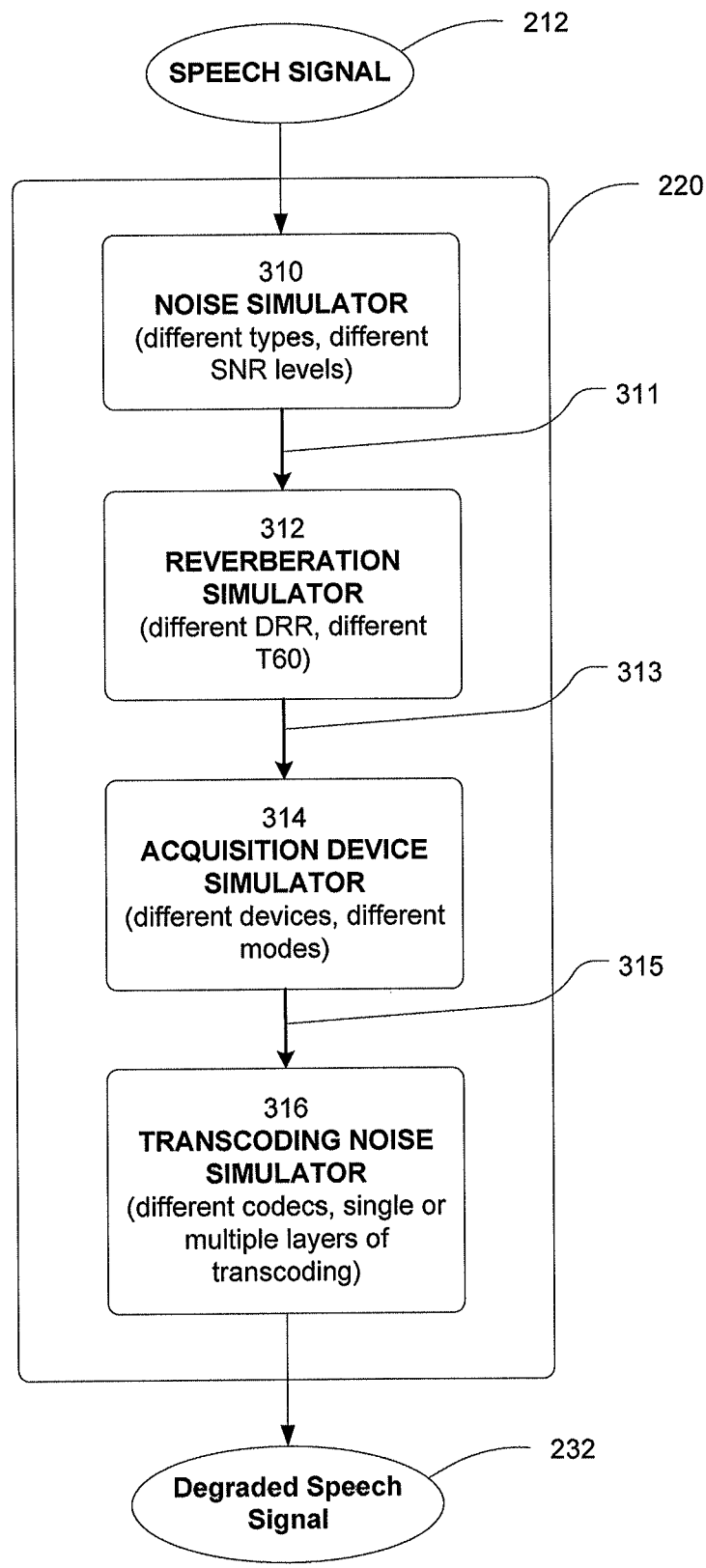
FIG. 3 is a block diagram illustrating elements of an acoustic channel simulator according to exemplary embodiments of the present disclosure.

Turning to FIG. 3, the acoustic channel simulator 220 includes one or more nuisance noise simulators, including a noise simulator 310, a reverberation simulator 312, an acquisition device simulator 314 and/or a transcoding noise simulator 316. Each of these simulators is discussed in turn below, and each configurably modifies the recognition speech signal 212 to produce the degraded speech signal 214. The recognition speech signal 212 may be sequentially modified by each of the nuisance noise simulators in an order typical of a real-world example such as the sequential order shown in FIG. 3 and further described below. For example, an utterance by a speaker in a noisy environment would be captured with the direct environmental noises and the reflections (or reverberation) thereof. The acquisition device (e.g., microphone) would then add its characteristics, followed by any transcoding noise of the channel. It will be appreciated by those having skill in the art that different audio capturing circumstances may include a subset of nuisance factors. Thus the acoustic channel simulator 220 may be configured to use a subset of nuisance noise simulators and/or to include affects from each nuisance noise simulator at variable levels.

The noise simulator 310 may add one or more kinds of environmental or background noise to the recognition speech signal 212. The types of noise may include babble, ambient, and/or HVAC noises. However, additional or alternative types of noise may be added to the signal. Each type of environmental noise may be included at a selectable different level. In some embodiments the environmental noise may be added at a level in relation to the amplitude of the recognition speech signal 212. In a non-limiting example, any of five signal-to-noise ratio (SNR) levels may be selected: 0 dB, 5 dB, 10 dB, 20 dB and 30 dB. In other embodiments, the selected noise type(s) may be added at a specified amplitude regardless of the amplitude of the recognition speech signal. In some embodiments, noise type, level, SNR or other environmental noise characteristics may be varied according to a predetermined array of values. Alternatively, each value may be configured across a continuous range of levels, SNRs, etc. to best compensate for the most typical environments encountered for a particular application. In some exemplary embodiments, sets of noise types, levels, SNRs, etc., may be included in one or more environment profiles stored in a memory (e.g., memory 24), and the noise simulator 310 may be iteratively configured according to the one or more environment profiles, merged versions of two or more environment profiles, or individual characteristics within one or more of the environment profiles. In some embodiments, one or more noise types may be added from a previously stored audio sample, while in other embodiments, one or more noise types may be synthesized, e.g., by FM synthesis. In experiments, the inventors mixed the recognition speech signal 212 with real audio noise while controlling the noise level to simulate a target SNR. Some noise types, such as fan or ambient noise, are constant (stationary) while others, such as babble, are relatively random in frequency, timing, and amplitude. The different types of noise may thus be added over an entire recognition speech signal 212, while others may be added randomly or periodically to selected regions of the recognition speech signal 212. After adding the one or more kinds of environmental and/or background noise to the recognition speech signal 212 the noise simulator 310 outputs a resulting first intermediate speech signal 311, passed to the reverberation simulator 312.

The reverberation simulator 312 modifies the first intermediate speech signal 311 to include a reverberation of first intermediate speech signal, including the utterance and the environmental noise provided by the noise simulator 310. As some environments include a different amount of reverberation for different sources of sound, in some embodiments the reverberation simulator 312 may be configured to add reverberation of the utterance independent from addition of reverberation of environmental noise. In still other embodiments, each type of noise added by the noise simulator 310 may be independently processed by the reverberation simulator 312 to add a different level of reverberation. The amount and type of reverberation in real world settings is dependent on room size, microphone placement and speaker position with respect to the room and microphone. Accordingly, the reverberation simulator may be configured to simulate multiple rooms and microphone setups. For example, the reverberation simulator may choose from (or cycle through) 8 different room sizes and 3 microphone setups, for 24 different variations. In some embodiments, room size and microphone placement may be configured along a continuous range of sizes and placements in order to best compensate for the most typical settings encountered for a particular application. The simulated reverberation may be configured according to a direct-to-reverberation ratio (DRR) selected from a set of DRRs, and each DRR my have a corresponding time-to-reverberation at 60 dB (T60). The reverberation simulator 312 outputs a resultant second intermediate speech signal 313 to the acquisition device simulator 314.

The acquisition device simulator 314 may be used to simulate audio artifacts and characteristics of a variety of microphones used for acquisition of a recognition speech signal 212. As noted above speaker recognition subsystem 20 may receive recognition speech signals 212 from various telephones, computers, and microphones 10. Each acquisition device 10 may affect the quality of the recognition speech signal 212 in a different way, some enhancing or decreasing amplitude of particular frequencies, truncating the frequency range of the original utterance, some adding electrical noise, etc. The acquisition device simulator thus selectably or sequentially adds characteristics duplicating, or at least approximating common sets of acquisition device characteristics. For example, nuisance factors typical of most-popular phone types (e.g., APPLE IPHONE and SAMSUNG GALAXY) may be simulated by the acquisition device simulator.

The acquisition device simulator 314 may include a memory device or access to a shared memory device (e.g., memory 24) that stores audio acquisition device profiles. Each audio acquisition device profile may include one or more audio characteristics such as those mentioned in the previous paragraph, and which may be selectable and/or configurable. For instance, each audio acquisition device profile may include one or more of a frequency/equalization characteristic, an amplitude characteristic, a filtering characteristic, an electrical noise characteristic, and a physical noise characteristic. In some embodiments, each audio acquisition device profile may correspond to a particular audio acquisition device (e.g., a particular phone model). Alternatively, as with the channel noise simulator 310 and the reverberation noise simulator 312, in some embodiments each audio characteristic of an acquisition device may be selected from a predetermined set of audio characteristics or varied across a continuous range to provide a variety of audio characteristics during training iterations. For example, one or more of filter settings, amplitude level, equalization electrical noise level, etc. may be varied per training iteration. That is, the acquisition device simulator 314 may choose from (or cycle through) an array of values for each acquisition device characteristic, or may choose from (or cycle through) a set of audio acquisition device profiles. In some embodiments, acquisition device characteristics may be synthesized, while in some embodiments acquisition device characteristics may be stored in memory (e.g., memory 24) as an audio sample. The output of the acquisition device simulator 314 is a third intermediate speech signal 315 that is passed to the transcoding noise simulator 316.

In the transcoding noise simulator 316, sets of audio encoding techniques are applied to the third intermediate speech signal 315 to simulate the audio effects typically added in the transcoding of an audio signal. Transcoding varies depending on application, and may include companding (dynamic range compression of the signal to permit communication via channel having limited dynamic range and expansion at the receiving end) and/or speech audio coding (e.g., data compression) used in mobile or Voice over IP (VoIP) devices. In some embodiments, sixteen different audio encoding techniques may be selectively implemented: four companding codecs (e.g., G.711 μ-law, G.711 A-law), seven mobile codecs (e.g. AMR narrow-band, AMR wide-band (G.722.2)), and five VoIP codecs (e.g. iLBC, Speex). In some instances plural audio encoding techniques may be applied simultaneously (or serially) to the same third intermediate speech signal 315 to simulate instances where a recognition speech signal 212 may be transcoded multiple times along its route. Different audio coding techniques or representative audio characteristics thereof may be stored in respective transcoding characteristic profiles. In some embodiments, the characteristic profiles may include a quantization error noise characteristic, a sampling rate audio artifact characteristic, and/or a data compression audio artifact characteristic. The transcoding noise simulator 316 may choose from (or cycle through) an array of values for each audio encoding technique, or may choose from (or cycle through) the transcoding characteristic profiles. In some embodiments, the third intermediate speech signal may be subjected to actual transcoding according to one or more of the audio transcoding techniques to generate the degraded speech signal 214.

The acoustic channel simulator 220 may be configured to iteratively train the first CNN 230 multiple times for each recognition speech signal of multiple recognition speech signals, changing noise characteristics for each iteration, or to successively train the first CNN 230 using a plurality of recognition speech signals, each recognition speech signal being processed only once, but modifying at least one noise characteristic for each recognition speech sample. For example, as described above, for each iteration one or more characteristics of environmental noise, reverberation, acquisition device noise and/or transcoding noise may be modified in order to broaden the intra-speaker variability.

Once the acoustic channel simulator 220 has generated the degraded speech signal 214, there are two ways to use it: the first is during the offline training of the speaker recognition system, while the second is during speaker enrollment and speaker testing. The former uses the degraded speech signal to train features or universal background models that are not resilient to such channel variability, while the latter uses the degraded speech signal to enrich a speaker model or the test utterance with all possible channel conditions.

Returning to FIG. 2B, after the first CNN 230 is trained, the test and enrollment system 200B is in a test and enrollment of recognition speech signals. The acoustic channel simulator 220, signal analyzer 240 and loss function processor 250 (each shown in dotted lines) need not be further used. That is, the trained first CNN 230 may receive a recognition speech signal 212 from input 210 transparently passed through a dormant acoustic channel simulator 220, and may produce channel-compensated low-level features 232 for use by the remainder of a speaker recognition subsystem 20 as passed transparently through a dormant loss function processor 250. Alternatively, as illustrated in FIG. 2C, a trained channel-compensation CNN 230 may be used alone in instances where further training would be unwarranted or rare.

The feed forward convolutional neural network 230 illustrated in FIGS. 2A-C is trained to create a new set of features that are both robust to channel variability and relevant to discriminate between speakers. To achieve the first goal, the trained, channel-compensated CNN 230 takes as input the degraded speech signal described above and generates as output "clean" or channel-compensated features that matches handcrafted features extracted by signal analyzer 240 from a non-degraded recognition speech signal. The handcrafted features could be, for example, MFCC (Mel frequency cepstrum coefficients), LFCC (linear frequency cepstrum coefficients), PLP (Perceptual Linear Predictive), MFB (Mel-Filter Bank) or CQCC (constant Q cepstral coefficient). Specifically, "handcrafted features" may refer to features for parameters such as windows size, number of filters, etc. were tuned by manual trial and error, often over a number of years. FIG. 2A illustrates the training process.

The configuration of CNN 230 may include an input layer, a plurality of convolutional layers, a Log layer, and an output layer. In a non-limiting embodiment, the input layer may be configured to expect a raw signal (e.g., recognition speech signal) of 110 milliseconds that corresponds to 880 samples (assuming that the sampling rate is 8 kHz). In some embodiments six convolutional layers may be utilized, with six corresponding max-pooling layers, each using rectified linear unit (ReLu) activation. For example convolutional layers may have a configuration as shown in Table 1 below.

TABLE 1

| Convolutional layer | | Max Pooling Layer |
|---|---|---|
| Layer | Number of filters | Filter Size | Stride |
| 1 | 16 | 11 | 5 |
| 2 | 32 | 7 | 2 |
| 3 | 32 | 7 | 2 |
| 4 | 32 | 7 | 2 |
| 5 | 32 | 7 | 2 |
| 6 | 32 | 7 | 11 |

The Log layer may be an element-wise Log layer (log (X+0.01)), where X is greater than zero (X>0). The inventors determined that inclusion of the Log Layer provides lower loss values, and higher speaker recognition accuracy. The offset (0.01) is included to avoid extreme cases (e.g., where $\log(X) = -\infty$ as X approaches zero. The output layer may include twenty output units that correspond to the dimension of desired acoustic features (e.g., MFCC or CQCC). In at least one embodiment, batch normalization is applied to each convolutional layer. It will be acknowledged by those of ordinary skill in the art that the number and configuration of convolutional and max pooling layers may be varied to achieve different results.

In experimental results, the acoustic features resulting from the above CNN configuration were applied to a Gaussian Mixture Model (GMM) speaker recognition system and the recognition results compared with the same system employing baseline MFCC features. Results indicated significant improvement, with a 52% relative drop in equal error rate (EER) over the same system employing baseline MFCC features.

The signal analyzer 240 in FIG. 2A may be configured to perform spectral or cepstral analysis to produce handcrafted acoustic features, e.g., coefficients for MFCC, constant Q cepstral coefficients (CQCC), Low Frequency Cepstral Coefficients (LFCC) or the like. These handcrafted features are evaluated against the channel-compensated low-level features from the CNN 230 by the Loss function processor 250.

The loss function processor 250 receives the channel-compensated low-level features 232 and the handcrafted acoustic features 242 and calculates a loss result 252. The loss function employed by the loss function processor 250 may include a mean squared error function. However, it will be acknowledged by those having skill in the art that other loss functions could be employed. As noted above, the loss result 252 may be used to update connection weights for nodes of the first CNN 230 when the loss result is greater than a predetermined threshold. If the loss result is less than or equal to the threshold, the training is complete. If all iterations of training are completed without satisfying the threshold, the training may be considered failed for the training set of recognition speech signals.

Figure 4:
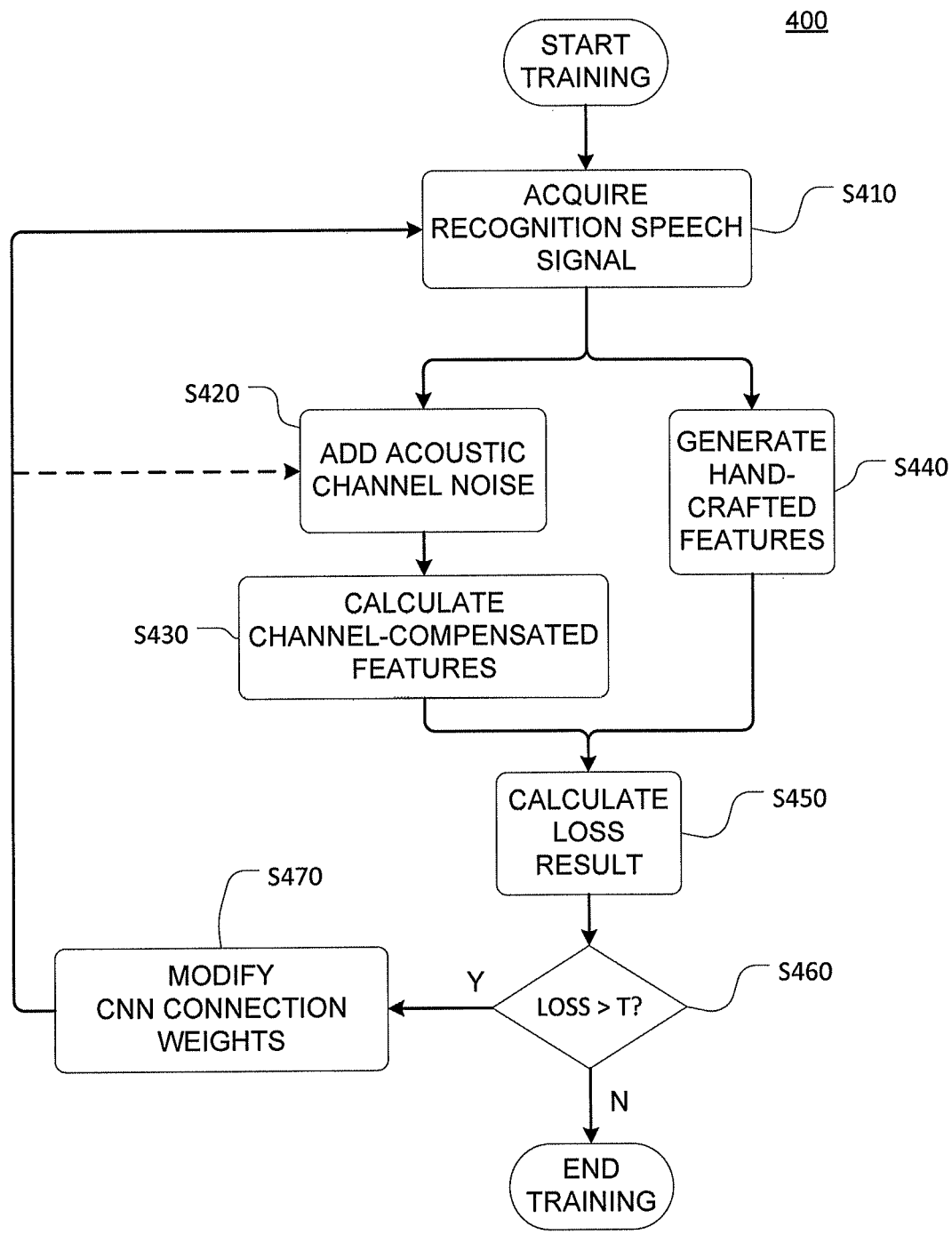
FIG. 4 is a flowchart for a method of training a channel-compensated feed forward convolutional neural network according to exemplary embodiments of the present disclosure.

FIG. 4 is a flowchart for a training operation or method 400 for training a channel-compensated feed forward convolutional neural network (e.g., 230) according to exemplary embodiments of the present disclosure. The training operation 400 includes an operation for acquiring a recognition speech signal (S410). The recognition speech signal (e.g., 212 in prior figures) may be obtained from a set of recognition speech signals previously stored (e.g., in memory 24), obtained from an audio acquisition device such as a microphone or set of microphones, or from a remote source such as a repository having one or more speaker recognition data sets. In the latter case, recognition speech signals may be obtained from a plurality of repositories. The recognition speech signal may include raw audio recordings.

In operation S420, acoustic channel noise is added to the recognition speech signal to produce a degraded speech signal (such as degraded speech signal 214 in previous figures). Operation S420 is described in greater detail below with respect to FIG. 5. In operation S430, channel-compensated features are generated from the degraded speech signal by a first feed forward convolutional neural network (such as CNN 230 in previous figures). In operation S440, handcrafted features (e.g., coefficients of at least one of MFCC, LFCC, PLP, etc.) are derived from the recognition speech signal according to conventional methods. In operation S450, a loss result is calculated from the channel-compensated features and the handcrafted features. In some exemplary embodiments, a mean squared error function may be used for satisfactory results. However, it is acknowledged that other loss functions may be employed.

In operation S460 the loss result is compared with a threshold loss. If the calculated loss if less than or equal to the threshold, the method 400 is complete, and the channel compensated feed forward convolutional neural network is considered trained with respect to the speech signals provided. However, if the calculated loss is greater than the threshold, the calculated loss is used to modify connection weights (S470) of the first (i.e., channel compensating) CNN, and the method 400 is performed again using a new recognition speech signal and/or changed parameters for the acoustic channel noise. In some embodiments, (see solid arrow to S410 from S470) training of the CNN may include several passes using all recognition speech signals, each pass using a different acoustic channel noise configuration. In other embodiments (see dashed arrow to S420) each recognition speech signal may be processed iteratively until all desired acoustic channel noise configurations are considered before processing a next recognition speech signal. In yet other embodiments, recognition speech signals may be processed serially, each recognition speech signal using a different acoustic channel noise configuration.

Those having skill in the art will recognize that the threshold comparison at operation S460 may alternatively consider training complete when the calculated loss is less than the threshold, and incomplete when the calculated loss is greater than or equal to the threshold.

Figure 5:
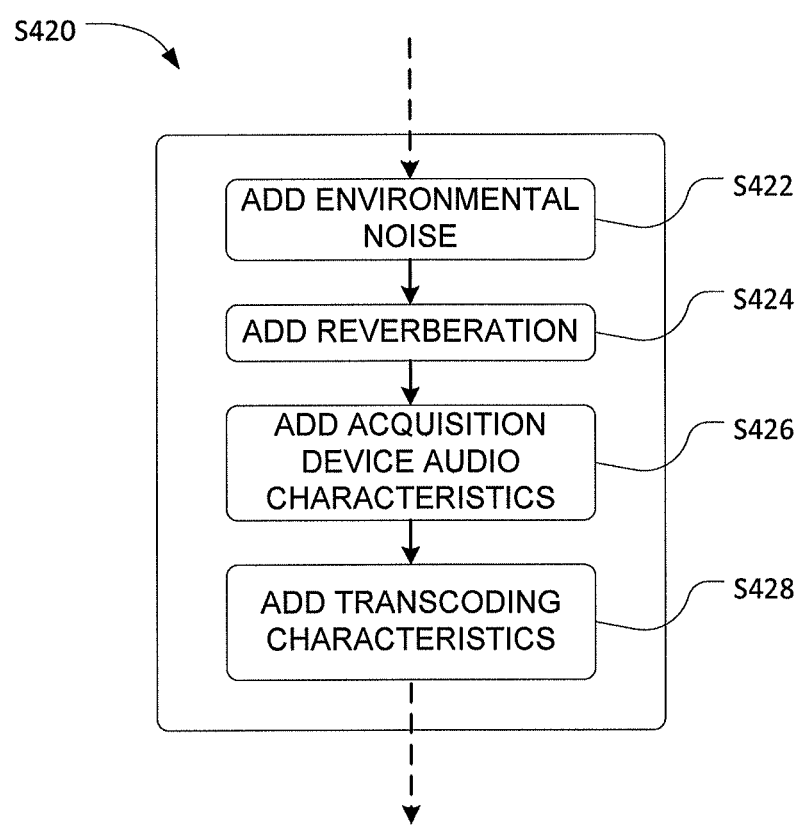
FIG. 5 is a flowchart adding channel noise in the method of FIG. 4, according to exemplary embodiments of the present disclosure.

FIG. 5 is a flowchart providing additional detail to operation S420 to add channel noise in the method 400 of FIG. 4. In operation S422, a recognition speech signal may be modified to include environmental or background noise according to a configuration using one or more selectable noise types at one or more respective signal-to-noise ratios (SNRs), (e.g., as described above with respect to noise simulator 310 in FIG. 3). In operation S424 a resulting modified speech signal may be further modified to include reverberation according to a configuration using one or more times-to-reverberation at 60 dB ((T60, e.g., as described above with respect to reverberation simulator 312 in FIG. 3). In operation S426 the further modified speech signal may be yet further modified to include audio acquisition device characteristics e.g., audio artifacts, corresponding to one or more acquisition devices (e.g., microphone, telephone, etc.) in different modes (e.g., as described above with respect to acquisition device simulator 314 in FIG. 3). Similarly, the signal resulting from adding acquisition device audio characteristics may be further modified at operation S428 to selectively include transcoding characteristics corresponding to one or more audio channels. For example, an audio channel may utilize one or more audio compression codecs that introduce loss of audio fidelity, and the effects of one or more such codecs may be applied to the speech signal, e.g., as described above with respect to transcoding noise simulator 316 in FIG. 3.

As noted above, in some embodiments each recognition speech signal for training may be iteratively processed with per-iteration modification(s) to the acoustic channel noise configuration. The result of the acoustic channel noise adding operation S420 is a degraded speech signal appropriate for training a convolutional neural network to compensate for channel and background noise.

It is desirable to generate acoustic features that are not only channel robust, as is addressed by the systems described above, but also increase the inter-speaker variability and decrease the intra-speaker variability. To do so, the inventors put in cascade the pre-trained channel-compensated CNN model described above (e.g., systems 200A-200C) with a second CNN that is speaker-aware. The second neural network model 600 is illustrated in FIG. 6.

The second neural network model 600 includes, in addition to the channel compensated feature generator 610 (such as systems 200A-200C detailed above), a convolutional neural network having an input layer 620, convolutional layers 630, and a max pooling layer 640 that outputs bottleneck features. For training, the second neural network model 600 may additionally include one or more fully connected layers 650 and an output layer 660. An input layer may be two-dimensional, having a first dimension corresponding to an audio sample length (e.g., 110 milliseconds) and a second dimension corresponding to the number of acoustic features (i.e. feature vectors) from the channel compensated feature generator 610 (e.g., CNN 230). In some embodiments, two convolutional layers 620 may employed, utilizing a scaled tan h activation and respectively having number and size of filters of (32, (15, 20)) and (64, (3, 1)). (E.g., 32 filters of size 15×20.) The max pooling layer 640 operates over the time axis and its output is denoted as bottleneck features. The fully connected layers 650 may include 256 hidden units each and, like the convolutional layer may utilize scaled tan h for activation. The output layer 660 may have 3622 output units, each output unit corresponding to a single particular speaker in training data. Naturally, the system may be scaled to accommodate a different number of speakers. To avoid overfitting, a dropout technique may be used in the fully connected layers 650 and output layer 660, instead of, e.g., batch normalization. In an exemplary embodiment a dropout ratio may be about 30%.

Bottleneck features are a set of activations of nodes over time from a bottleneck layer in a trained deep neural network (DNN). The bottleneck layer is a hidden layer in the DNN of reduced dimension relative to the other layers (e.g., 3 nodes compared to 20). This DNN can be trained to discriminate between different output classes such as senones, speakers, conditions, etc. Using a bottleneck layer in the DNN ensures that all information required to ultimately determine the posteriors at the DNN's output layer is restrained to a small number of nodes. (See Ferrer, et al., "Exploring the Role of Phonetic Bottleneck Features for Speaker and Language Recognition", 2016 IEEE International Conference on Acoustics, Speech and Signal Processing (ICASSP), 5575-5579.)

When the bottleneck features are applied in classifying a particular speech signal under test against models (e.g., Gaussian Mixture Model), the loss function to minimize for classification is categorical Cross-Entropy. While the fully-connected layers 650 and the output layer 660 are used for training, they are discarded at test and enrollment times as noted above, as only the trained CNN network need be used to extract bottleneck features that could be used independently of the back-end classifier (i.e., the fully connected layers 650 and output layer 660).

FIG. 7 is a block diagram of a speaker recognition system employing a plurality of feature generators 710 to input, in parallel to second neural network 700, Feature sets 1 to N. Features 1 to N (710) may include any of various hand-crafted and learned features, such as MFCCs, LFCCs, filter-banks and glottal features, which were historically designed to address speaker recognition problems, as well as channel-compensated features discussed above. The improved results of such technique compared to a classical score fusion technique may be about 10%. Another advantage is that, compared with score fusion schemes, which requires scores from two or more system, the disclosed multi-DNN front end implements a single, standalone system, thus, reducing computational and development costs.

The second neural network 700 corresponds to the second neural network 600 described above with respect to FIG. 6, and is thus not described again. However, as input the second neural network 700 may receive a plurality of acoustic features sets in addition to channel compensated features from a channel-compensated feature generator 710 (such as systems 200A-200C discussed in detail above).

A possible architecture is thus similar to that of FIG. 6 but with three-dimensional input instead of two-dimensional input, where the third dimension defines the feature type.

In the preceding detailed description, various specific details are set forth in order to provide an understanding of the creation and use of channel compensated low-level features for speaker recognition, and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

The present invention and particularly the speaker recognition subsystem 20 generally relates to an apparatus for performing the operations described herein. This apparatus may be specially constructed for the required purposes such as a graphics processing unit (GPU), digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a computer readable storage medium, such as, but is not limited to, any type of disk including optical disks, CD-ROMs, magneto-optical disks, read-only memories (ROMs), random access memories (RAMs), EPROMs, EEPROMs, magnetic or optical cards, integrated memory, "cloud" storage, or any type of computer readable media suitable for storing electronic instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method comprising:
   receiving, by a computer, a speech signal containing an utterance;
   extracting, by the computer, low-level channel compensated features from the speech signal by executing a convolutional neural network (CNN),
      the CNN being trained to minimize a loss function between low-level channel compensated features calculated from a plurality of computer-degraded training speech signals and low-level handcrafted features from corresponding clean training speech signals; and
   executing, by the computer, a deep neural network (DNN) on the extracted low-level channel compensated features to recognize a speaker of the utterance in the speech signal.

2. The computer-implemented method of claim 1, wherein the low-level channel compensated features extracted from the speech signal include at least one of: Mel-frequency cepstrum coefficients (MFCCs), low-frequency cepstrum coefficients (LFCCs), perceptual linear prediction (PLP) coefficients, linear or Mel filter banks, and glottal features.

3. The computer-implemented method of claim 1, wherein the DNN includes a plurality of convolutional layers, the method further comprising:
   executing, by the computer, the plurality of convolutional layers on the low-level channel compensated features extracted by the CNN to increase inter-speaker variability and decrease intra-speaker variability.

4. The computer-implemented method of claim 1, wherein the DNN includes a plurality of fully connected layers, the method further comprising:
   executing, by the computer, the fully connected layers on the low-level channel compensated features extracted by the CNN and other handcrafted or learned features to increase inter-speaker variability and decrease intra-speaker variability.

5. The computer-implemented method of claim 4, wherein one or more of the handcrafted or learned features include at least one of: MFCC, LFCCs, PLP, filter-banks, and glottal features.

6. The computer-implemented method of claim 1, wherein the computer-degraded training speech signals include the corresponding clean training speech signals degraded with at least one of: environmental noise, reverberation, acquisition device audio artifacts, and transcoding noise.

7. The computer-implemented method of claim 1, wherein recognizing the speaker of the utterance includes identifying the speaker.

8. The computer-implemented method of claim 7, wherein identifying the speaker comprises:
   generating, by the computer, a voiceprint of the speaker based upon executing the DNN on the extracted low-level channel compensated features; and
   matching, by the computer, the generated voiceprint to at least one voiceprint in a predefined list of a plurality of voiceprints.

9. The computer-implemented method of claim 1, wherein recognizing the speaker of the utterance includes verifying the speaker.

10. The computer-implemented method of claim 9, wherein verifying the speaker comprises:
    generating, by the computer, a voiceprint of the speaker based upon executing the DNN on the extracted low-level channel compensated features; and
    comparing, by the computer, the generated voiceprint of the speaker with at least one registered voiceprint of the speaker.

11. A system comprising:
    a non-transitory storage medium storing a plurality of computer program instructions; and
    a processor electrically coupled to the non-transitory storage medium and configured to execute the computer program instructions to:
      receive a speech signal containing an utterance;
      extract low-level channel compensated features from the speech signal by deploying a convolutional neural network (CNN),
        the CNN being trained to minimize a loss function between low-level channel compensated features calculated from a plurality of computer-degraded training speech signals and low-level handcrafted features from corresponding clean training speech signals; and
      deploy a deep neural network (DNN) on the extracted low-level channel compensated features to recognize a speaker of the utterance in the speech signal.

12. The system of claim 11, wherein the low-level channel compensated features extracted from the speech signal include at least one of: Mel-frequency cepstrum coefficients (MFCCs), low-frequency cepstrum coefficients (LFCCs), perceptual linear prediction (PLP) coefficients, linear or Mel filter banks, and glottal features.

13. The system of claim 11, wherein the DNN includes a plurality of convolutional layers, and wherein the processor is configured to further execute the plurality of computer program instructions to:

deploy the plurality of convolutional layers on the low-level channel compensated features extracted by the CNN to increase inter-speaker variability and decrease intra-speaker variability.

14. The system of claim 11, wherein the DNN includes a plurality of fully connected layers, and wherein the processor is configured to further execute the plurality of computer program instructions to:
deploy the plurality of fully connected layers on the low-level channel compensated features extracted by the CNN and other handcrafted or learned features to increase inter-speaker variability and decrease intra-speaker variability.

15. The system of claim 14, wherein one or more of the handcrafted or learned features include at least one of: MFCC, LFCCs, PLP, filter-banks, and glottal features.

16. The system of claim 11, wherein the computer-degraded training speech signals include the corresponding clean training speech signals degraded with at least one of: environmental noise, reverberation, acquisition device audio artifacts, and transcoding noise.

17. The system of claim 11, wherein recognizing the speaker of the utterance includes identifying the speaker.

18. The system of claim 17, wherein the processor is configured to further execute the computer program instructions to:
generate a voiceprint of the speaker based upon deploying the DNN on the extracted low-level channel compensated features; and
match the generated voiceprint to at least one voiceprint in a predefined list of a plurality of voiceprints to identify the speaker.

19. The system of claim 11, wherein recognizing the speaker of the utterance includes verifying the speaker.

20. The system of claim 19, wherein the processor is configured to further execute the computer program instructions to:
generate a voiceprint of the speaker based upon deploying the DNN on the extracted low-level channel compensated features; and
compare the generated voiceprint of the speaker with at least one registered voiceprint of the speaker to identify the speaker.

* * * * *